(12) United States Patent
Geurts

(10) Patent No.: US 10,958,861 B2
(45) Date of Patent: Mar. 23, 2021

(54) IMAGE SENSORS WITH IN-PIXEL AMPLIFICATION CIRCUITRY

(71) Applicant: SEMICONDUCTOR COMPONENTS INDUSTRIES, LLC, Phoenix, AZ (US)

(72) Inventor: Tomas Geurts, Haasrode (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/661,209

(22) Filed: Oct. 23, 2019

(65) Prior Publication Data

US 2021/0014444 A1 Jan. 14, 2021

Related U.S. Application Data

(60) Provisional application No. 62/872,620, filed on Jul. 10, 2019.

(51) Int. Cl.
*H04N 5/374* (2011.01)
*H04N 5/3745* (2011.01)
*H04N 5/353* (2011.01)
*H04N 5/378* (2011.01)

(52) U.S. Cl.
CPC ......... *H04N 5/3745* (2013.01); *H04N 5/3532* (2013.01); *H04N 5/378* (2013.01)

(58) Field of Classification Search
None
See application file for complete search history.

(56) References Cited

U.S. PATENT DOCUMENTS

| | | | | |
|---|---|---|---|---|
| 5,471,515 | A | * | 11/1995 | Fossum .................. H04N 5/361 377/60 |
| 6,456,326 | B2 | * | 9/2002 | Fossum ................ G11C 19/285 348/308 |
| 6,747,264 | B2 | | 6/2004 | Miida |

(Continued)

OTHER PUBLICATIONS

UMBC. (Dec. 5, 2000). "Advanced VLSI Design: Subsystem Design." Retrieved from http://ece-research.unm.edu/jimp/vlsi/slides/chap8_2.pdf.

*Primary Examiner* — James M Hannett
(74) *Attorney, Agent, or Firm* — Treyz Law Group, P.C.; Joseph F. Guihan

(57) ABSTRACT

An image sensor may include an imaging pixel, readout circuitry, and amplification circuitry coupled between the imaging pixel and the readout circuitry. Correlated double sampling may be used to sample a reset voltage and a signal voltage from the imaging pixel. The difference between the reset voltage and the signal voltage may reflect the amount of light received by the imaging pixel during an integration time. The amplification circuitry may amplify the difference between the reset voltage and the signal voltage. The amplification circuitry may include a source follower transistor coupled between first and second capacitors, with the second capacitor having a greater capacitance than the first capacitor. The amplification circuitry may be formed only from n-type metal-oxide-semiconductor transistors. The amplification circuitry may consume power dynamically as opposed to consuming static power for minimal power consumption requirements.

20 Claims, 7 Drawing Sheets

(56) References Cited

U.S. PATENT DOCUMENTS

| | | | | |
|---|---|---|---|---|
| 2009/0303340 A1* | 12/2009 | Itano | ................... | H04N 5/3742 |
| | | | | 348/222.1 |
| 2010/0231562 A1* | 9/2010 | Brown | .............. | H01L 27/14643 |
| | | | | 345/207 |
| 2017/0041561 A1* | 2/2017 | Akahane | ............ | A61B 1/00009 |
| 2018/0035868 A1* | 2/2018 | Saito | ................... | A61B 1/0661 |
| 2018/0098005 A1* | 4/2018 | Hanzawa | ............... | H04N 5/359 |

* cited by examiner

IMAGE SENSORS WITH IN-PIXEL AMPLIFICATION CIRCUITRY

CROSS-REFERENCE TO RELATED APPLICATIONS

This application claims the benefit of U.S. Provisional Patent Application No. 62/872,620, filed on Jul. 10, 2019, the entire contents of which is incorporated herein by reference.

BACKGROUND

This relates generally to imaging devices, and more particularly, to imaging devices having in-pixel amplification circuitry.

Image sensors are commonly used in electronic devices such as cellular telephones, cameras, and computers to capture images. In a typical arrangement, an image sensor includes an array of image pixels arranged in pixel rows and pixel columns.

Typical image pixels contain a photodiode for generating charge in response to incident light. Image pixels may also include a charge storage region for storing charge that is generated in the photodiode. Image sensors can operate using a global shutter or a rolling shutter scheme. In a global shutter, every pixel in the image sensor may simultaneously capture an image, whereas in a rolling shutter each row of pixels may sequentially capture an image.

Circuitry may be coupled to each pixel for reading out image signals from the image pixels. However, some conventional image sensors may have higher than desired noise during readout. Reducing noise may require including undesirably large capacitors in the imaging pixels.

It would therefore be desirable to be able to provide improved imaging pixels with in-pixel amplifiers for readout with reduced noise.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
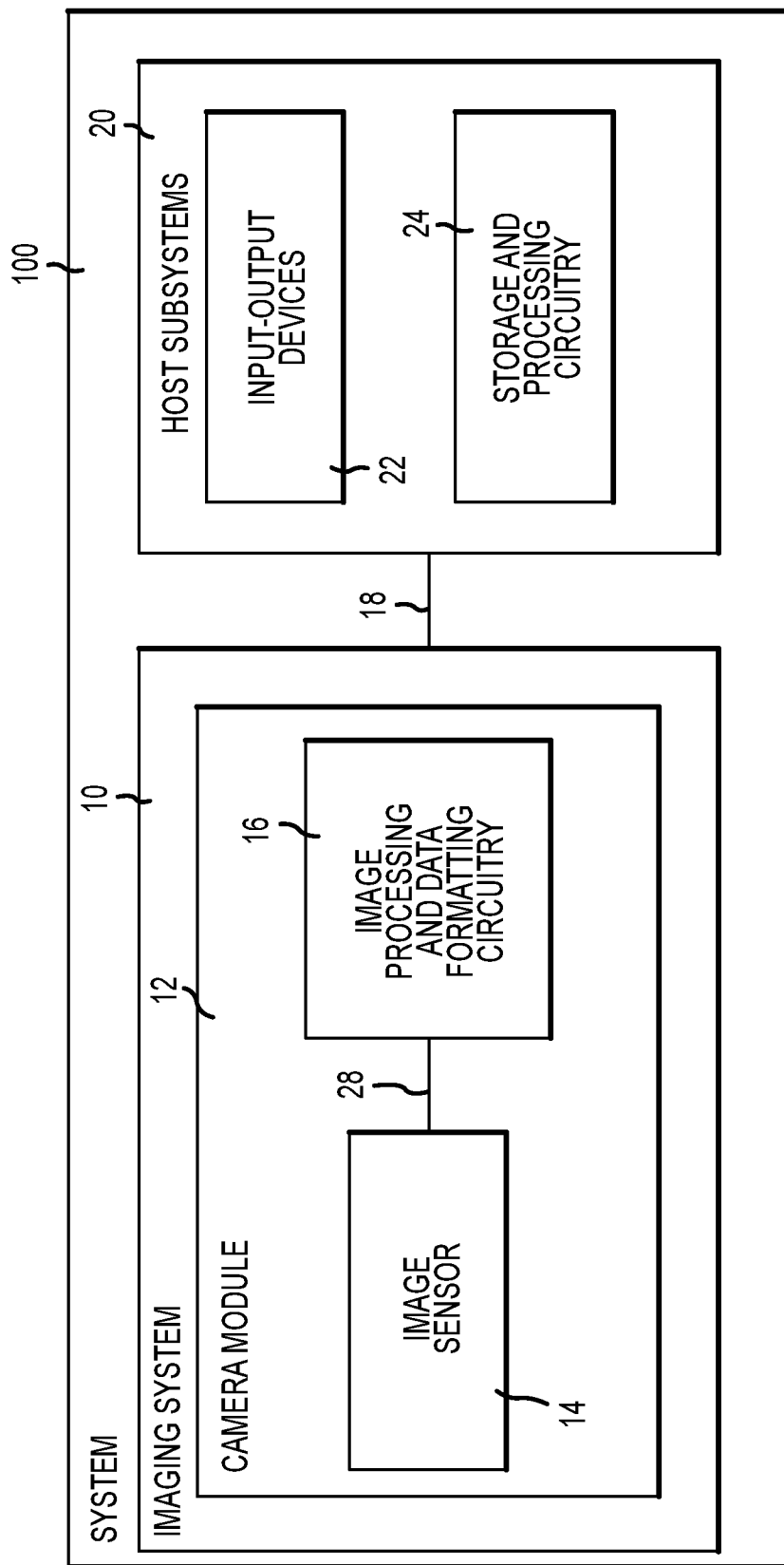
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
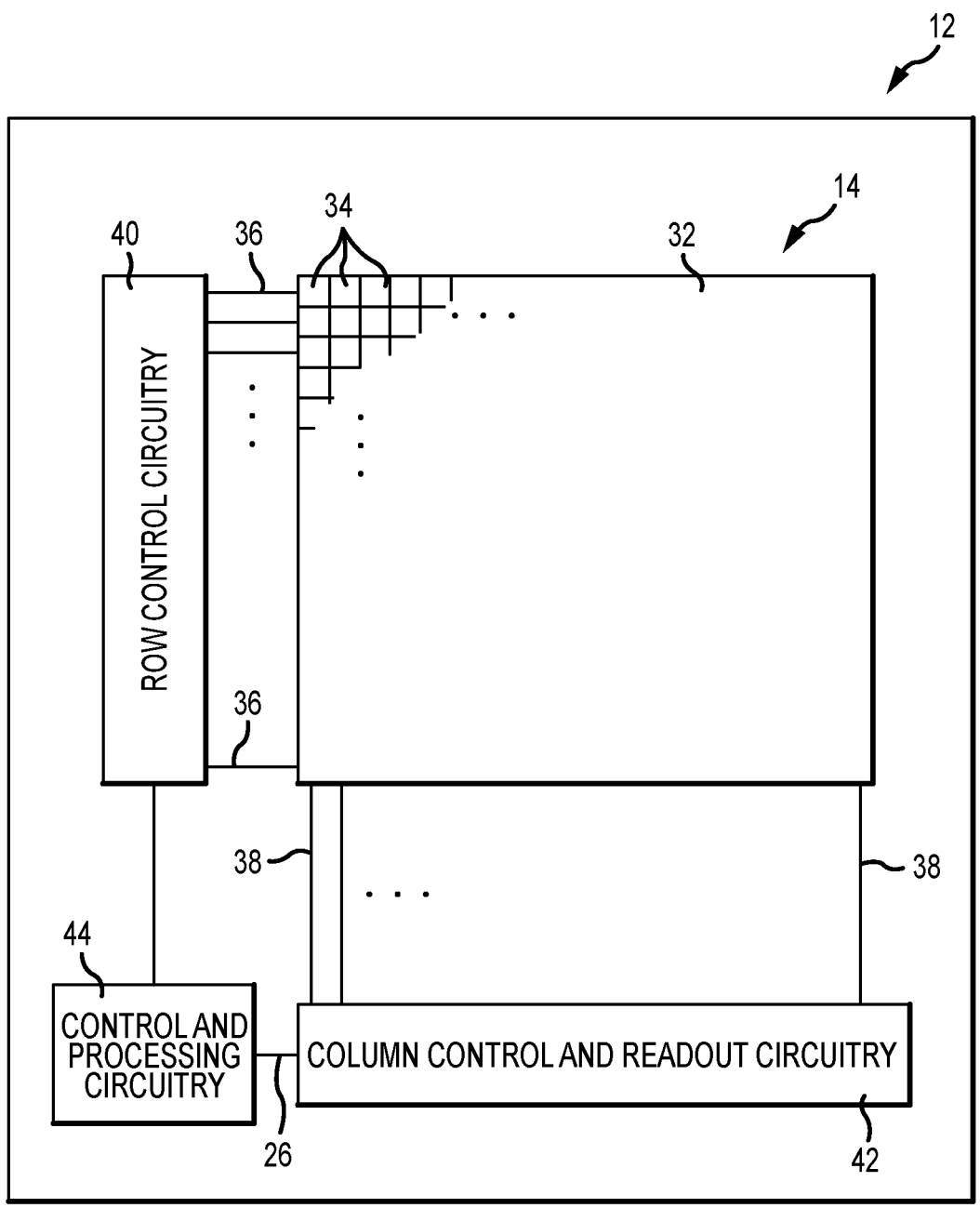
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34) and may also include control circuitry 40 and 42. Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 34.

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

It may be desired for the pixels of image sensor 14 to have global shutter capabilities. During global shutter operations, every pixel in the image sensor may simultaneously capture an image, then the signals from the pixels are read out row-by-row. To enable global shutter capabilities, a storage node may be incorporated into the imaging pixel that allows storage of the signals. However, in backside illuminated image sensors, it may be difficult to prevent light leakage from compromising the charge stored in the pixel. Backside illuminated global shutter image sensors may therefore store signals in the voltage domain. An example of such an arrangement is shown in FIG. 3.

Figure 3:
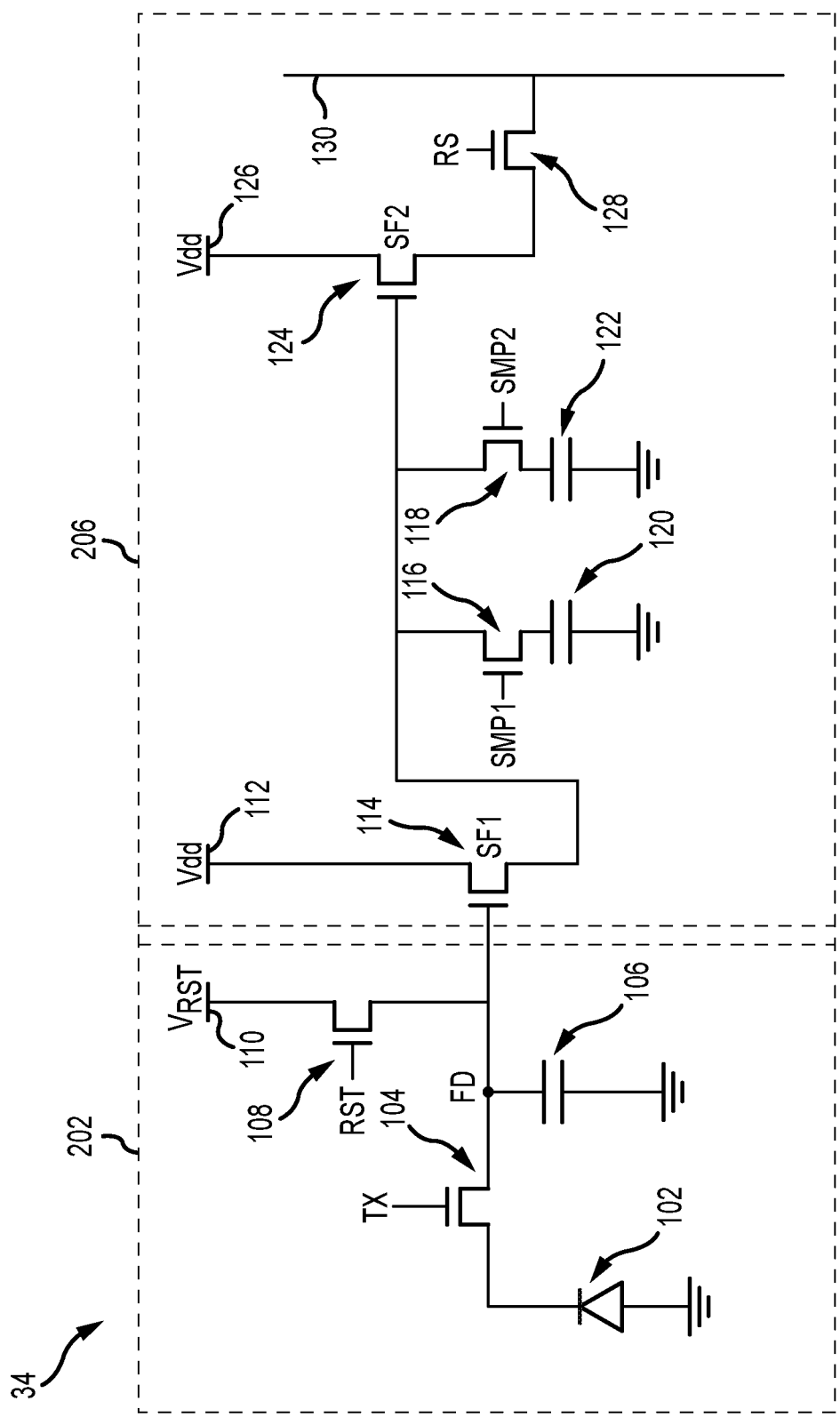
FIG. 3 is a circuit diagram of an illustrative imaging pixel having readout circuitry that enables global shutter operations in accordance with an embodiment.

FIG. 3 is a pixel diagram of an illustrative imaging pixel 34. As shown, pixel 34 may include a photosensitive element 102 (e.g., a photodiode). Photosensitive element 102 has a first terminal that is coupled to ground. The second terminal of photosensitive element 102 is coupled to transfer transistor 104. Transfer transistor 104 is coupled to floating diffusion (FD) region FD with an associated floating diffusion capacitance 106. A reset transistor 108 may be coupled between floating diffusion region FD and voltage supply 110. Voltage supply 110 may provide a voltage $V_{RST}$. Floating diffusion region FD may be a doped semiconductor region (e.g., a region in a silicon substrate that is doped by ion implantation, impurity diffusion, or other doping process).

Source follower transistor 114 (SF1) has a gate terminal coupled to floating diffusion region FD and a first terminal of reset transistor 108. Source follower transistor 114 also has a first source-drain terminal coupled to voltage supply 112. Voltage supply 112 may provide a power supply voltage VDD. In this application, each transistor is illustrated as having three terminals: a source, a drain, and a gate. The source and drain terminals of each transistor may be changed depending on how the transistors are biased and the type of transistor used. For the sake of simplicity, the source and drain terminals are referred to herein as source-drain terminals or simply terminals. A second source-drain terminal of source follower transistor 114 is coupled to sampling transistors 116 and 118.

Sampling transistor 116 may be interposed between source follower transistor 114 and a first storage capacitor 120. Sampling transistor 118 may be interposed between source follower transistor 114 and a first storage capacitor 122. Sampling transistors 116 and 118 are also coupled to a gate terminal of source follower transistor 124 (SF2). Source follower transistor 124 has a first source-drain terminal coupled to voltage supply 126. A second source-drain terminal of source follower transistor 124 is coupled to column output line 130 through row select transistor 128. The bias voltage provided at voltage supplies 110, 112, and 126 may be the same or may be different.

A gate terminal of transfer transistor 104 receives control signal TX. A gate terminal of reset transistor 108 receives control signal RST. A gate terminal of row select transistor 128 receives control signal RS. A gate terminal of sampling transistor 116 receives control signal SMP1. A gate terminal of sampling transistor 118 receives control signal SMP2. Control signals TX, RST, RS, SMP1, and SMP2 may be provided by row control circuitry (e.g., row control circuitry 40 in FIG. 2) over control paths (e.g., control paths 36 in FIG. 2).

As shown in FIG. 3, photodiode 102, transfer transistor 104, floating diffusion region FD, reset transistor 108, and bias voltage supply terminal 110 may sometimes collectively be referred to as pixel circuitry 202. Source follower transistor 114, bias voltage supply terminal 112, sampling transistor 116, sampling transistor 118, capacitor 120, capacitor 122, source follower transistor 124, bias voltage supply terminal 126, row select transistor 128, and column output line 130 may sometimes collectively be referred to as readout circuitry 206. This distinction between pixel circuitry and readout circuitry is merely illustrative.

During operation of pixel 34, charge may accumulate in photodiode 102 in response to incident light. The amount of charge accumulated in the photodiode may be proportional to the intensity of the incident light received and the exposure time of the imaging pixel. Before the conclusion of the integration time of the pixel, the floating diffusion region may be reset to a reset voltage by asserting reset transistor 108. Then, charge from the photodiode may be transferred to floating diffusion region FD by asserting transfer transistor 104.

Readout circuitry 206 may be used to implement double sampling techniques. In double sampling, a reset value and a signal value are obtained during readout. The reset value may then be subtracted from the signal value during subsequent processing to help correct for noise. The double sampling may be correlated double sampling (in which the reset value is sampled before the signal value) or uncorrelated double sampling (in which the reset value is sampled after the signal value is sampled). Any of the samples taken during operation of the pixel of FIG. 3 may use correlated double sampling or uncorrelated double sampling. In general, each of the imaging pixels described herein (e.g., any of the imaging pixels of FIGS. 3-7) may use correlated double sampling or uncorrelated double sampling.

Readout circuitry 206 in FIG. 3 may readout the reset voltage and signal voltage of the imaging pixel. For example, after the floating diffusion region is reset, the reset level may be sampled onto capacitor 120 by asserting transistor 116. Then, after the charge is transferred onto the floating diffusion region, the signal level may be sampled onto capacitor 122 by asserting transistor 118. The reset level may subsequently be sampled by asserting transistor 116 and row select transistor 128. Similarly, the signal level may subsequently be sampled by asserting transistor 118 and row select transistor 128.

Readout circuitry of the type shown in FIG. 3 may enable global shutter imaging using imaging pixel 34. The reset and signal levels may be obtained and stored in capacitors 120 and 122 globally, then read out from capacitors 120 and 122 in a row-by-row fashion. However, in order to minimize noise in the sampled reset and signal levels, capacitors 120 and 122 may need to be very large. The large capacitors may undesirably take up large amounts of area on the substrate for the imaging sensor.

Figure 4:
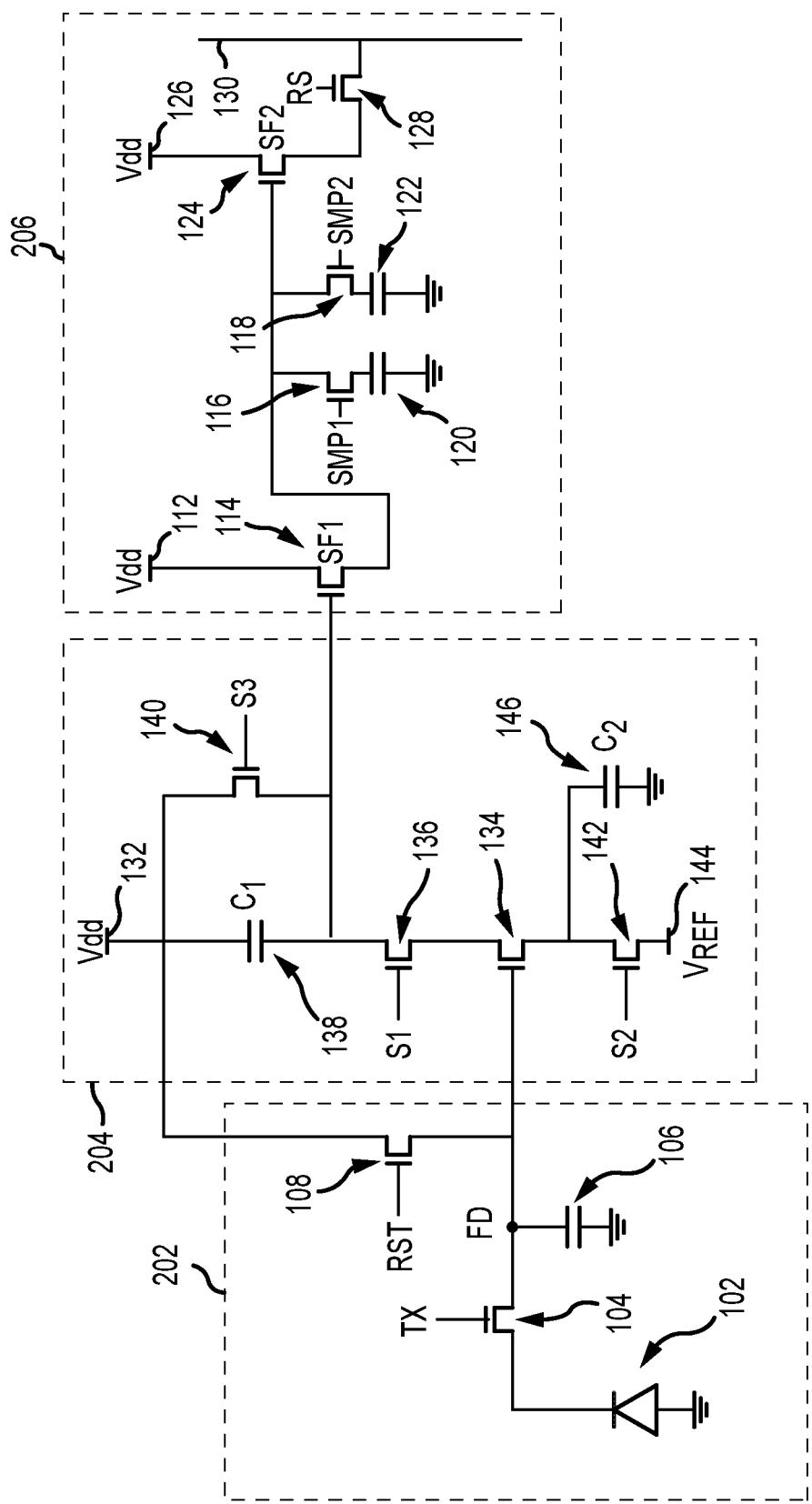
FIG. 4 is a circuit diagram of an illustrative imaging pixel having in-pixel amplification circuitry in accordance with an embodiment.

To reduce the size of the capacitors required, in-pixel amplification circuitry may be incorporated into the pixels. An example of an imaging pixel with in-pixel amplification circuitry is shown in FIG. 4. As shown in FIG. 4, pixel 34 may include a photosensitive element 102 (e.g., a photodiode). Photosensitive element 102 has a first terminal that is coupled to ground. The second terminal of photosensitive element 102 is coupled to transfer transistor 104. Transfer transistor 104 is coupled to floating diffusion (FD) region FD with an associated floating diffusion capacitance 106. A reset transistor 108 may be coupled between floating diffusion region FD and bias voltage supply terminal 132.

Photodiode 102, transfer transistor 104, floating diffusion region FD, and reset transistor 108 may collectively be referred to as pixel circuitry. Instead of pixel circuitry 202 being coupled directly to readout circuitry 206 as in FIG. 3, pixel circuitry 202 in FIG. 4 is coupled to amplification circuitry 204.

As shown in FIG. 4, amplification circuitry 204 includes source follower transistor 134 that has a gate terminal coupled to floating diffusion region FD. Source follower transistor 134 has a first terminal coupled to transistor 136. Transistor 136 has a first terminal coupled to source follower transistor 134. Transistor 136 has a second terminal that is coupled to capacitor 138 ($C_1$) and transistor 140. Capacitor 138 is coupled between transistor 136 and bias voltage supply terminal 132. Transistor 140 has a first terminal coupled to bias voltage supply terminal 132 and a second terminal coupled transistor 136 and a plate of capacitor 138. Source follower transistor 134 has a second terminal that is coupled to transistor 142 and capacitor 146. Capacitor 146 is coupled between transistor 134 and ground. Transistor 142 (sometimes referred to as reset transistor 142) is coupled between transistor 134 and bias voltage supply terminal 144.

Transistor 140 (sometimes referred to as reset transistor 140) may have a gate terminal that receives control signal S3, transistor 136 may have a gate terminal that receives control signal S1, and transistor 142 may have a gate terminal that receives control signal S2. Control signals S1, S2, and S3 may be provided by row control circuitry (e.g., row control circuitry 40 in FIG. 2) over control paths (e.g., control paths 36 in FIG. 2). Bias voltage supply terminal 144 may provide a reference voltage $V_{REF}$. Bias voltage supply terminal 132 may provide a bias voltage $V_{DD}$.

The amplification circuitry 204 may be coupled to readout circuitry 206. Readout circuitry 206 in FIG. 4 may be the same as readout circuitry 206 in FIG. 3. The gate terminal of source follower transistor 114 is coupled to capacitor 138.

In-pixel amplification circuitry 204 may be used to amplify signals from floating diffusion region FD. During readout operations, floating diffusion region FD may be reset by asserting transistor 108. Then, capacitors $C_1$ and $C_2$ may be reset by asserting transistors 140 and 142. Asserting transistor 140 pulls capacitor $C_1$ to bias voltage $V_{DD}$. Asserting transistor 142 pulls capacitor $C_2$ to bias voltage $V_{REF}$. Source follower transistor 134 may have a corresponding threshold voltage $V_{TH}$.

At this point, after the floating diffusion region and capacitors $C_1$ and $C_2$ have been reset, the voltage on floating diffusion region FD may be $V_{FD}$, the voltage of $C_1$ is $V_{DD}$, and the voltage of $C_2$ is $V_{REF}$. Then, transistor 136 may be asserted while transistors 142 and 140 are deasserted. This causes $C_2$ to be charged to $V_{FD}$-$V_{TH}$. To the first order, all charge flowing into capacitor $C_2$ must come from capacitor $C_1$. Minor portions of the charge may come out of parasitic capacitances at various nodes. This can be leveraged for amplification by making capacitor $C_2$ larger than capacitor $C_1$. The parasitic capacitors may cause small variations in the gain from pixel to pixel.

The capacitance of a capacitor is equal to the charge on the capacitor divided by the voltage between the plates (e.g., C=q/V). A change in the floating diffusion voltage may be reflected in a change in the voltage of capacitor $C_2$. The change in the charge on capacitor $C_2$ when the floating diffusion voltage changes may be given by $dQ_2=C_2*dV_2$, where $dQ_2$ is the change in charge, $C_2$ is the capacitance of capacitor 146, and $dV_2$ is the change in voltage of capacitor 146 (caused by the change in $V_{FD}$). Similarly, the change in the charge on $C_1$ is given by $dQ_1=C_1*dV_1$, where $dQ_1$ is the change in charge, $C_1$ is the capacitance of capacitor 138, and $dV_1$ is the change in voltage of capacitor 138. Because all of the charge flowing into $C_2$ has to come from $C_1$, $dQ_1$ may be set equal to $dQ_2$. This means that $C_1*dV_1=C_2*dV_2$. Solving for $dV_1$ provides a result of $dV_1=C_2*dV_2/C_1$. By making $C_2$ larger than $C_1$, the voltage change on capacitor 138 may be amplified relative to the voltage change on capacitor 146.

Consider an example where capacitor $C_2$ has a capacitance that is ten times larger than the capacitance of $C_1$. In this example, $C_2=10*C_1$, which results in an equation of $dV_1=(10*C_1)*dV_2/C_1$, which simplifies to $dV_1=10*dV_2$. In other words, the voltage change on capacitor 138 may be ten times the voltage change on capacitor 146. In an example where the floating diffusion voltage changes by 0.1 V, the voltage of $C_2$ may change by 0.1 V, which results in the voltage of $C_1$ changing by 1.0 V. Changes in floating diffusion voltage $V_{FD}$ are therefore amplified by an amount equal to the ratio in capacitance between capacitors $C_1$ and $C_2$.

To implement correlated double sampling, a reset level then a signal level may be read from capacitor $C_1$ then stored. For example, after floating diffusion region FD, capacitor 138, and capacitor 146 are reset and transistor $S_1$ is asserted, the voltage level of capacitor 138 may be equal to the reset level. The reset level may be sampled by asserting transistor 116 to store the reset level (from $C_1$) on capacitor 120. Transfer transistor 104 may then be asserted, causing charge from the photodiode to be transferred to the floating diffusion region. This results in a corresponding voltage change at the floating diffusion region. The change in $V_{FD}$ is reflected in capacitor 146 and amplified in capacitor 138 as discussed above. After the transfer has occurred, the signal level may be sampled by asserting transistor 118 to store the signal level (from $C_2$) on capacitor 122. The reset level may subsequently be sampled onto column output line 130 by asserting transistor 116 and row select transistor 128. Similarly, the signal level may subsequently be sampled onto column output line 130 by asserting transistor 118 and row select transistor 128.

The capacitance of capacitor 146 may be more than twice the capacitance of capacitor 138, more than three times the capacitance of capacitor 138, more than five times the capacitance of capacitor 138, more than eight times the capacitance of capacitor 138, more than ten times the capacitance of capacitor 138, more than twenty times the capacitance of capacitor 138, between three and fifteen times the capacitance of capacitor 138, etc. It is also realized that in certain arrangements, the capacitance of capacitor 146 may be equal to or less than the capacitance of capacitor 138.

The in-pixel amplification circuitry 204 shown in FIG. 4 may be implemented using only n-type metal-oxide-semiconductor (nMOS) transistors. This may offer manufacturing improvements (e.g., reduced manufacturing complexity and cost) compared to amplification circuitry where both n-type metal-oxide-semiconductor transistors and p-type metal-oxide-semiconductor (pMOS) transistors are used. Additionally, amplification circuitry 204 consumes power dynamically (e.g., only intermittently consumes power when required) as opposed to consuming static power (e.g., always consuming power). The amplification circuitry of FIG. 4 therefore has minimal power consumption requirements.

It should be understood that bias voltage supply terminals 132, 112, and 126 need not provide the same bias voltage.

Bias voltage supply terminals 132, 112, and 126 may provide the same bias voltage or different bias voltages. Additionally, additional bias voltage supply terminals may be provided if desired. For example, it may be desirable to have the drain of reset transistor 108 coupled to a different bias voltage than the drain of transistor 140. Similarly, capacitors 120, 122, and 146 are depicted as all being coupled to ground in FIG. 4. This example is merely illustrative, and capacitors 120, 122, and 146 may be coupled to different bias voltages if desired. In general, each component in FIG. 4 may be coupled to any desired bias voltage (e.g., a bias voltage that is provided to more than one component or a bias voltage that is provided to only that component).

The example in FIG. 4 of transistor 136 being interposed between source follower transistor 134 and capacitor 138 is merely illustrative. Transistor 136 may be interposed between source follower transistor 134 and capacitor 146 if desired.

There are numerous alternate arrangements that may use the amplification circuitry of FIG. 4. First, it is noted that the arrangement of pixel circuitry 202 in FIG. 4 is merely illustrative. In general, amplification circuitry 204 may be used to amplify signals from any desired pixel circuitry. The pixel circuitry may include an anti-blooming transistor, a dual conversion gain transistor, a dual conversion gain capacitor, one or more overflow capacitors, one or more overflow transistors, one or more charge storage regions in addition to the floating diffusion region, etc.

Similarly, any desired readout circuitry may be used as readout circuitry 206. The example in FIG. 4 of having first and second capacitors, two source follower transistors, etc. is merely illustrative. Readout circuitry 206 may instead include only a source follower transistor, row select transistor, and column output line. In general, readout circuitry 206 may include any desired components.

Figure 5:
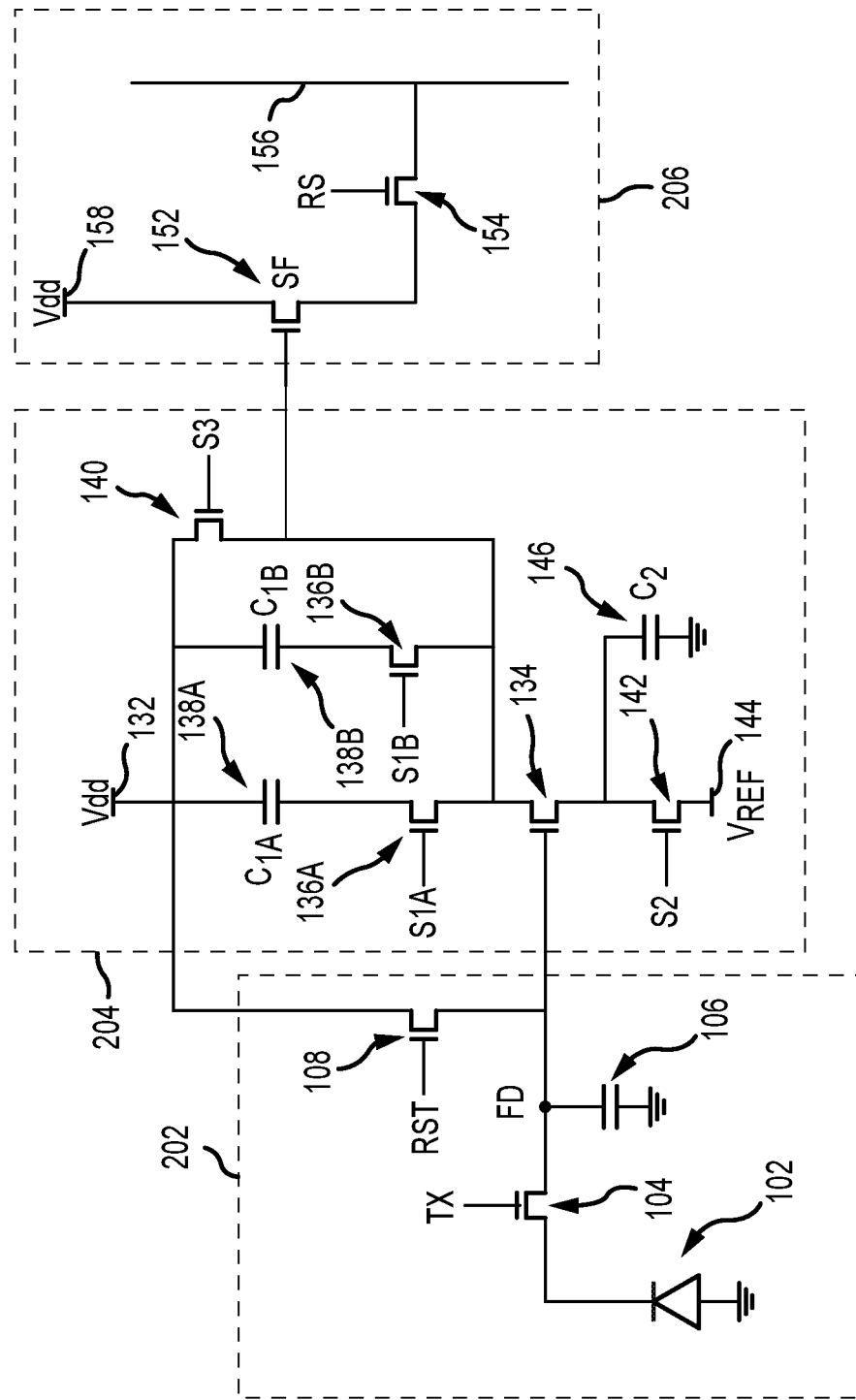
FIG. 5 is a circuit diagram of an illustrative imaging pixel having in-pixel amplification circuitry that includes first and second amplification capacitors in accordance with an embodiment.

If desired, capacitor 138 in FIG. 4 may be duplicated one or more times to allow for multiple amplified signals to be stored in the amplification circuitry. FIG. 5 is a pixel diagram of an illustrative arrangement of this type. As shown in FIG. 5, pixel circuitry 202 is the same as in FIG. 4. Much of amplification circuitry 204 in FIG. 5 is the same as in FIG. 4.

Amplification circuitry 204 includes source follower transistor 134 that has a gate terminal coupled to floating diffusion region FD. Source follower transistor 134 has a terminal that is coupled to transistor 142 and capacitor 146. Capacitor 146 is coupled between transistor 134 and ground. Transistor 142 is coupled between transistor 134 and bias voltage supply terminal 144.

Unlike the circuitry of FIG. 4, the source follower transistor 134 of FIG. 5 has an additional terminal coupled to both transistor 136A and transistor 136B. Transistor 136A has a first terminal coupled to source follower transistor 134. Transistor 136B has a first terminal coupled to source follower transistor 134. Transistor 136A has a second terminal that is coupled to capacitor 138A ($C_{1A}$). Transistor 136B has a second terminal that is coupled to capacitor 138B ($C_{1B}$). Capacitor 138A is coupled between transistor 136A and bias voltage supply terminal 132. Capacitor 138B is coupled between transistor 136A and bias voltage supply terminal 132. Transistor 140 has a first terminal coupled to bias voltage supply terminal 132 and a second terminal coupled to transistor 136A and transistor 136B.

Transistor 140 may have a gate terminal that receives control signal S3, transistor 136A may have a gate terminal that receives control signal S1A, transistor 136B may have a gate terminal that receives control signal S1B, and transistor 142 may have a gate terminal that receives control signal S2. Control signals S1A, S1B, S2, and S3 may be provided by row control circuitry (e.g., row control circuitry 40 in FIG. 2) over control paths (e.g., control paths 36 in FIG. 2). Bias voltage supply terminal 144 may provide a reference voltage $V_{REF}$. Bias voltage supply terminal 132 may provide a bias voltage $V_{DD}$.

The capacitance of capacitor 146 may be more than twice the capacitance of capacitor 138A, more than three times the capacitance of capacitor 138A, more than five times the capacitance of capacitor 138A, more than eight times the capacitance of capacitor 138A, more than ten times the capacitance of capacitor 138A, more than twenty times the capacitance of capacitor 138A, between three and fifteen times the capacitance of capacitor 138A, etc.

The capacitance of capacitor 146 may be more than twice the capacitance of capacitor 138B, more than three times the capacitance of capacitor 138B, more than five times the capacitance of capacitor 138B, more than eight times the capacitance of capacitor 138B, more than ten times the capacitance of capacitor 138B, more than twenty times the capacitance of capacitor 138B, between three and fifteen times the capacitance of capacitor 138B, etc.

The capacitance of capacitor 138A may the same as the capacitance of capacitor 138B or may be different than the capacitance of capacitor 138B. Capacitor 138A may be reset by asserting transistors 136A and transistor 140. Capacitor 138B may be reset by asserting transistors 136B and transistor 140.

The presence of first and second capacitors 138A and 138B may allow for two amplified signals to be stored during the operation of pixel 34. For example, after floating diffusion region FD, capacitor 138A, capacitor 138B, and capacitor 146 are reset. When transistor 136A is asserted, changes in the voltage of capacitor $C_2$ may be reflected in capacitor $C_{1A}$. When transistor 136B is asserted, changes in the voltage of capacitor $C_2$ may be reflected in capacitor $C_{1B}$. In this manner, a reset level may be sampled in a first capacitor and a signal level may be sampled in a second capacitor. Alternatively, first and second signal levels may optionally be sampled in the first and second capacitors.

The amplification circuitry 204 may be coupled to readout circuitry 206. Readout circuitry 206 in FIG. 5 may include a source follower transistor 152 having a gate terminal that is coupled to transistors 136A and 136B. Source follower transistor 152 has a first terminal coupled to bias voltage supply terminal 158 and a second terminal coupled to row select transistor 154. Row select transistor 154 is interposed between source follower transistor 152 and column output line 156.

To sample the signal from capacitor 138A onto column output line 156, transistor 136A and row select transistor 154 may be asserted. To sample the signal from capacitor 138B onto column output line 156, transistor 136B and row select transistor 154 may be asserted.

Similar to as discussed in connection with FIG. 4, each component in FIG. 5 may be coupled to any desired bias voltage (e.g., a bias voltage that is provided to more than one component or a bias voltage that is provided to only that component).

Figure 6:
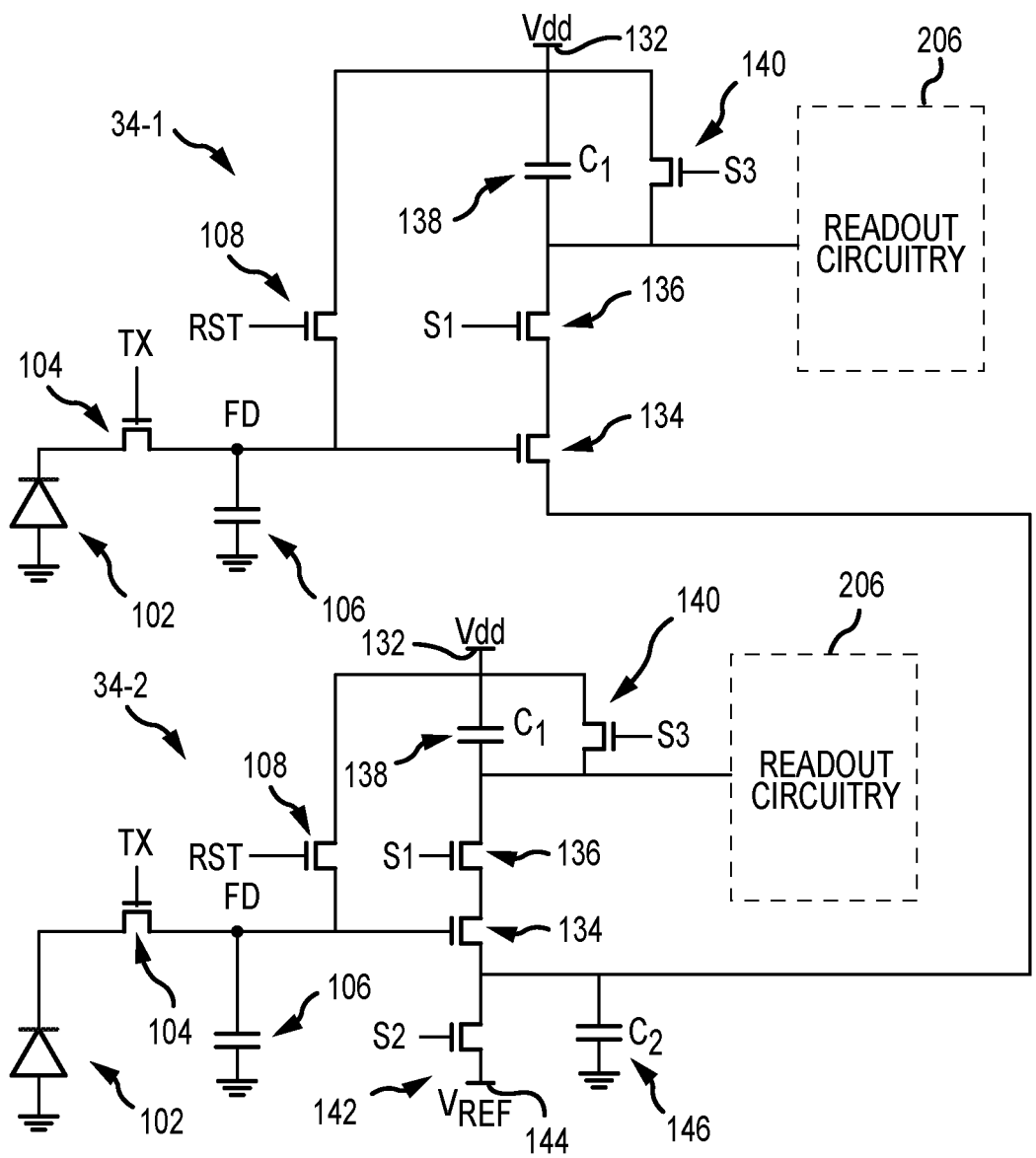
FIG. 6 is a circuit diagram of an illustrative image sensor showing how two or more imaging pixels may share portions of amplification circuitry in accordance with an embodiment.

Portions of the amplification circuitry may be shared between two or more imaging pixels in the image sensor. FIG. 6 shows an example of two adjacent imaging pixels that share part of the amplification circuitry. As shown in FIG. 6, the amplification circuitry of each imaging pixel may be the same as in FIG. 4, with a source follower transistor 134 coupled to the floating diffusion region FD, a transistor 136 coupled between source follower transistor 134 and capacitor 138, a reset transistor 140, etc. However, as shown in FIG. 6, transistor 142, bias voltage supply terminal 144, and capacitor 146 may be shared between pixels 34-1 and 34-2.

Transistor 142, bias voltage supply terminal 144, and capacitor 146 may be shared between any desired number of pixels (e.g., between two pixels, three pixels, four pixels, more than four pixels, more than ten pixels, more than twenty pixels, between two and five pixels, etc.). Transistor 142, bias voltage supply terminal 144, and capacitor 146 may be shared between pixels in adjacent rows, between pixels in adjacent columns, between pixels in non-adjacent rows, between pixels in non-adjacent columns, etc.

Similar to as discussed in connection with FIG. 4, each component in FIG. 6 may be coupled to any desired bias voltage (e.g., a bias voltage that is provided to more than one component or a bias voltage that is provided to only that component).

Figure 7:
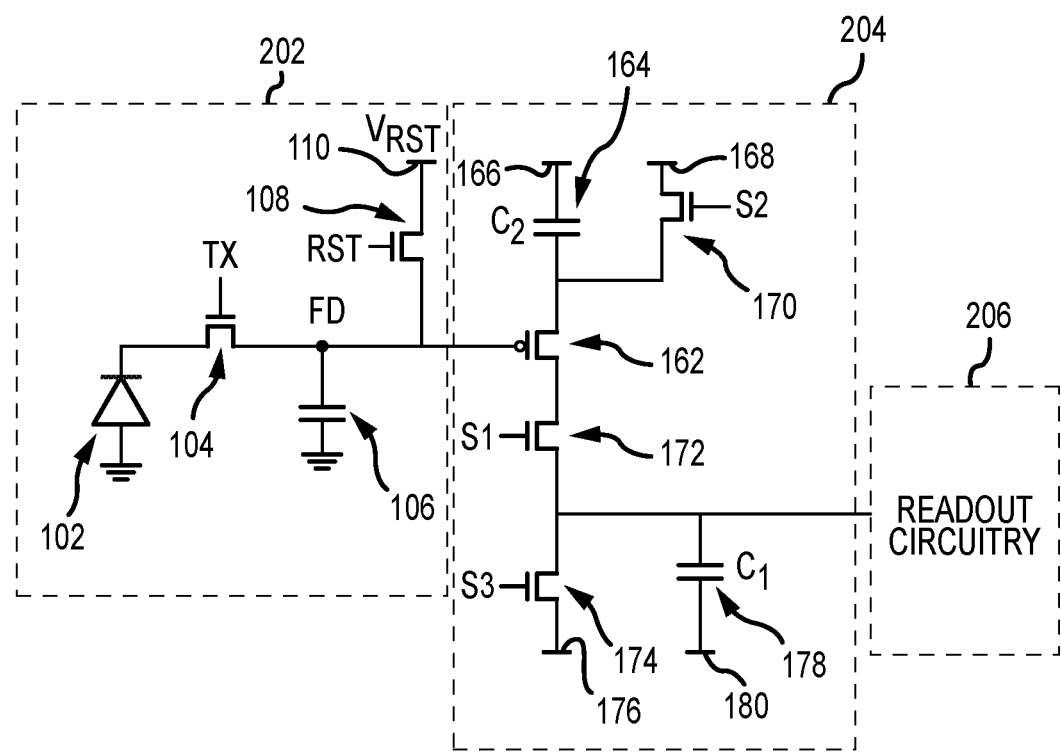
FIG. 7 is a circuit diagram of an illustrative imaging pixel having in-pixel amplification circuitry that includes a pMOS source follower transistor in accordance with an embodiment.

In an alternate arrangement, shown in FIG. 7, a pMOS transistor may be used to form the source follower transistor of the amplification circuitry instead of an nMOS transistor. As shown in FIG. 7, pixel 34 may include a photosensitive element 102 (e.g., a photodiode). Photosensitive element 102 has a first terminal that is coupled to ground. The second terminal of photosensitive element 102 is coupled to transfer transistor 104. Transfer transistor 104 is coupled to floating diffusion (FD) region FD with an associated floating diffusion capacitance 106. A reset transistor 108 may be coupled between floating diffusion region FD and bias voltage supply terminal 110.

Photodiode 102, transfer transistor 104, floating diffusion region FD, and reset transistor 108 may collectively be referred to as pixel circuitry 202. The pixel of FIG. 7 again includes amplification circuitry 204 similar to the amplification circuitry of FIG. 4. However, the amplification circuitry of FIG. 7 has a pMOS source follower transistor.

As shown in FIG. 7, amplification circuitry 204 includes pMOS source follower transistor 162 that has a gate terminal coupled to floating diffusion region FD. Source follower transistor 162 has a first terminal coupled to transistor 172. Transistor 172 has a first terminal coupled to source follower transistor 162. Transistor 172 has a second terminal that is coupled to capacitor 178 ($C_1$) and transistor 174. Capacitor 178 is coupled between transistor 172 and bias voltage supply terminal 180. Transistor 174 has a first terminal coupled to bias voltage supply terminal 176 and a second terminal coupled transistor 172 and a plate of capacitor 178. Source follower transistor 162 has a second terminal that is coupled to transistor 170 and capacitor 164. Capacitor 164 is coupled between transistor 162 and bias voltage supply terminal 164. Transistor 170 is coupled between transistor 162 and bias voltage supply terminal 168.

Transistor 174 may have a gate terminal that receives control signal S3, transistor 172 may have a gate terminal that receives control signal S1, and transistor 170 may have a gate terminal that receives control signal S2. Control signals S1, S2, and S3 may be provided by row control circuitry (e.g., row control circuitry 40 in FIG. 2) over control paths (e.g., control paths 36 in FIG. 2). Bias voltage supply terminals 110, 176, 180, 166, and 168 may each provide any desired bias voltage (e.g., a ground voltage, power supply voltage, reference voltage, etc.).

The amplification circuitry 204 may be coupled to readout circuitry 206. Readout circuitry 206 in FIG. 7 may be the same as readout circuitry 206 in FIG. 4 or may the same as readout circuitry 206 in FIG. 5. The readout circuitry may include a source follower transistor having a gate terminal coupled to capacitor 178.

In-pixel amplification circuitry 204 may be used to amplify signals from floating diffusion region FD. First, floating diffusion region FD may be reset by asserting transistor 108. Capacitors $C_1$ and $C_2$ may be reset by asserting transistors 170 and 174.

Then, transistor 172 may be asserted while transistors 170 and 174 are deasserted. This causes $C_2$ to be charged to $V_{FD}+V_{TH}$. All charge flowing into capacitor $C_2$ must come from capacitor $C_1$. This can be leveraged for amplification by making capacitor $C_2$ much larger than capacitor $C_1$, as discussed in connection with FIG. 4 above. The capacitance of capacitor 164 may be more than twice the capacitance of capacitor 178, more than three times the capacitance of capacitor 178, more than five times the capacitance of capacitor 178, more than eight times the capacitance of capacitor 178, more than ten times the capacitance of capacitor 178, more than twenty times the capacitance of capacitor 178, between three and fifteen times the capacitance of capacitor 178, etc.

To implement correlated double sampling, a reset level then a signal level may be read from capacitor $C_1$ then stored. For example, after floating diffusion region FD, capacitor 164, and capacitor 178 are reset and transistor 172 is asserted, the voltage level of capacitor 178 may be equal to the reset level and may be read out by readout circuitry 206. Transfer transistor 104 may then be asserted, causing charge from the photodiode to be transferred to the floating diffusion region. This results in a corresponding voltage change at the floating diffusion region. The change in $V_{FD}$ is reflected in capacitor 164 and amplified in capacitor 178. After the transfer has occurred, the signal level from capacitor $C_1$ may be sampled by readout circuitry 206.

As previously mentioned, source follower transistor 162 is a pMOS transistor. The other transistors in amplification circuitry 204 may be pMOS or nMOS transistors.

Similar to as discussed in connection with FIG. 4, each component in FIG. 7 may be coupled to any desired bias voltage (e.g., a bias voltage that is provided to more than one component or a bias voltage that is provided to only that component).

It should be reiterated that the arrangement of the pixel circuitry shown herein (e.g., in FIGS. 3-7) is merely illustrative. In general, the pixel circuitry in any of the aforementioned arrangements may include an anti-blooming transistor, a dual conversion gain transistor, a dual conversion gain capacitor, one or more overflow capacitors, one or more overflow transistors, one or more charge storage regions in addition to the floating diffusion region, etc. Similarly, any desired readout circuitry may be used in the aforementioned arrangements.

The foregoing is merely illustrative of the principles of this invention and various modifications can be made by those skilled in the art. The foregoing embodiments may be implemented individually or in any combination.

What is claimed is:

1. An image sensor comprising:
    an imaging pixel; and
    amplification circuitry coupled to the imaging pixel that includes a first capacitor having a first capacitance and a second capacitor having a second capacitance that is greater than the first capacitance, wherein the amplification circuitry includes a source follower transistor that is interposed between the first and second capacitors, and wherein charge is configured to flow from the first capacitor to the second capacitor causing a first voltage change on the second capacitor and a second voltage change that is greater than the first voltage change on the first capacitor.

2. The image sensor defined in claim 1, wherein the second capacitance is at least three times greater than the first capacitance and wherein the second voltage change is greater than the first voltage change by a factor that is proportional to a ratio of the second capacitance to the first capacitance.

3. The image sensor defined in claim 1, further comprising:
readout circuitry coupled to the first capacitor, wherein the readout circuitry is configured to sample a first voltage from the first capacitor before the second voltage change and wherein the readout circuitry is configured to sample a second voltage from the first capacitor after the second voltage change.

4. The image sensor defined in claim 1, wherein the imaging pixel has a floating diffusion region and wherein the source follower transistor has a gate terminal that is coupled to the floating diffusion region.

5. The image sensor defined in claim 1, wherein the imaging pixel has a floating diffusion region that is coupled to the amplification circuitry.

6. The image sensor defined in claim 5, wherein the imaging pixel includes a first reset transistor that is configured to reset the floating diffusion region, wherein the amplification circuitry comprises a second reset transistor that is configured to reset the first capacitor, and wherein the amplification circuitry comprises a third reset transistor that is configured to reset the second capacitor.

7. An image sensor comprising:
an imaging pixel that includes a photodiode and a floating diffusion region; and
amplification circuitry comprising:
a source follower transistor having a gate terminal coupled to the floating diffusion region of the imaging pixel;
a first capacitor having a first capacitance; and
a second capacitor having a second capacitance, wherein the source follower transistor is interposed between the first and second capacitors;
a transistor that is interposed between the source follower transistor and a selected one of the first capacitor and the second capacitor
a first reset transistor that is coupled to the first capacitor; and
a second reset transistor that is coupled to the second capacitor.

8. The image sensor defined in claim 7, wherein the source follower transistor is a first source follower transistor and wherein the gate terminal is a first gate terminal, the image sensor further comprising:
readout circuitry comprising a second source follower transistor that has a second gate terminal that is coupled to the first capacitor.

9. The image sensor defined in claim 7, wherein the second capacitance is greater than the first capacitance.

10. The image sensor defined in claim 7, wherein the first reset transistor is coupled between the first capacitor and a first bias voltage supply terminal and wherein the second reset transistor is coupled between the second capacitor and a second bias voltage supply terminal.

11. The image sensor defined in claim 10, wherein the source follower transistor is a p-type metal-oxide-semiconductor transistor and wherein the transistor, the first reset transistor, and the second reset transistor are n-type metal-oxide-semiconductor transistors.

12. The image sensor defined in claim 10, wherein the source follower transistor, the transistor, the first reset transistor, and the second reset transistor are n-type metal-oxide-semiconductor transistors.

13. The image sensor defined in claim 7, wherein the transistor is interposed between the source follower transistor and the first capacitor and wherein the amplification circuitry further comprises:
a third capacitor having a third capacitance; and
a second transistor that is interposed between the source follower transistor and the third capacitor.

14. The image sensor defined in claim 13, wherein the first reset transistor is configured to reset the first and third capacitors.

15. The image sensor defined in claim 7, further comprising:
an additional imaging pixel that includes an additional photodiode and an additional floating diffusion region, wherein the amplification circuitry further comprises:
an additional source follower transistor having a gate terminal coupled to the additional floating diffusion region of the additional imaging pixel; and
a third capacitor having a third capacitance, wherein the additional source follower transistor is interposed between the third capacitor and the second capacitor.

16. Amplification circuitry configured to amplify a change in an input signal, the amplification circuitry comprising:
a source follower transistor configured to receive the input signal at a gate terminal;
a first capacitor having a first capacitance;
a second capacitor having a second capacitance that is greater than the first capacitance, wherein the source follower transistor is interposed between the first and second capacitors; and
a first transistor that is interposed between the source follower transistor and a selected one of the first capacitor and the second capacitor, wherein, when the first transistor is asserted, the change in the input signal causes charge to flow from the first capacitor to the second capacitor resulting in a first voltage change on the second capacitor and a second voltage change on the first capacitor that is greater than the first voltage change.

17. The amplification circuitry defined in claim 16, wherein the second capacitance is at least three times greater than the first capacitance.

18. The amplification circuitry defined in claim 16, further comprising:
a first bias voltage supply terminal;
a second transistor that is coupled between the first bias voltage supply terminal and the first capacitor;
a second bias voltage supply terminal; and
a third transistor that is coupled between the second bias voltage supply terminal and the second capacitor.

19. The image sensor defined in claim 7, wherein the floating diffusion region has an associated floating diffusion capacitance.

20. The image sensor defined in claim 7, wherein the source follower transistor has first and second source-drain terminals, wherein the first source-drain terminal is coupled to the first capacitor, and wherein the second source-drain terminal is coupled to the second capacitor.

* * * * *